Sept. 13, 1960     P. SPENCE     2,952,136
REFRIGERATION MACHINE
Filed Dec. 16, 1955
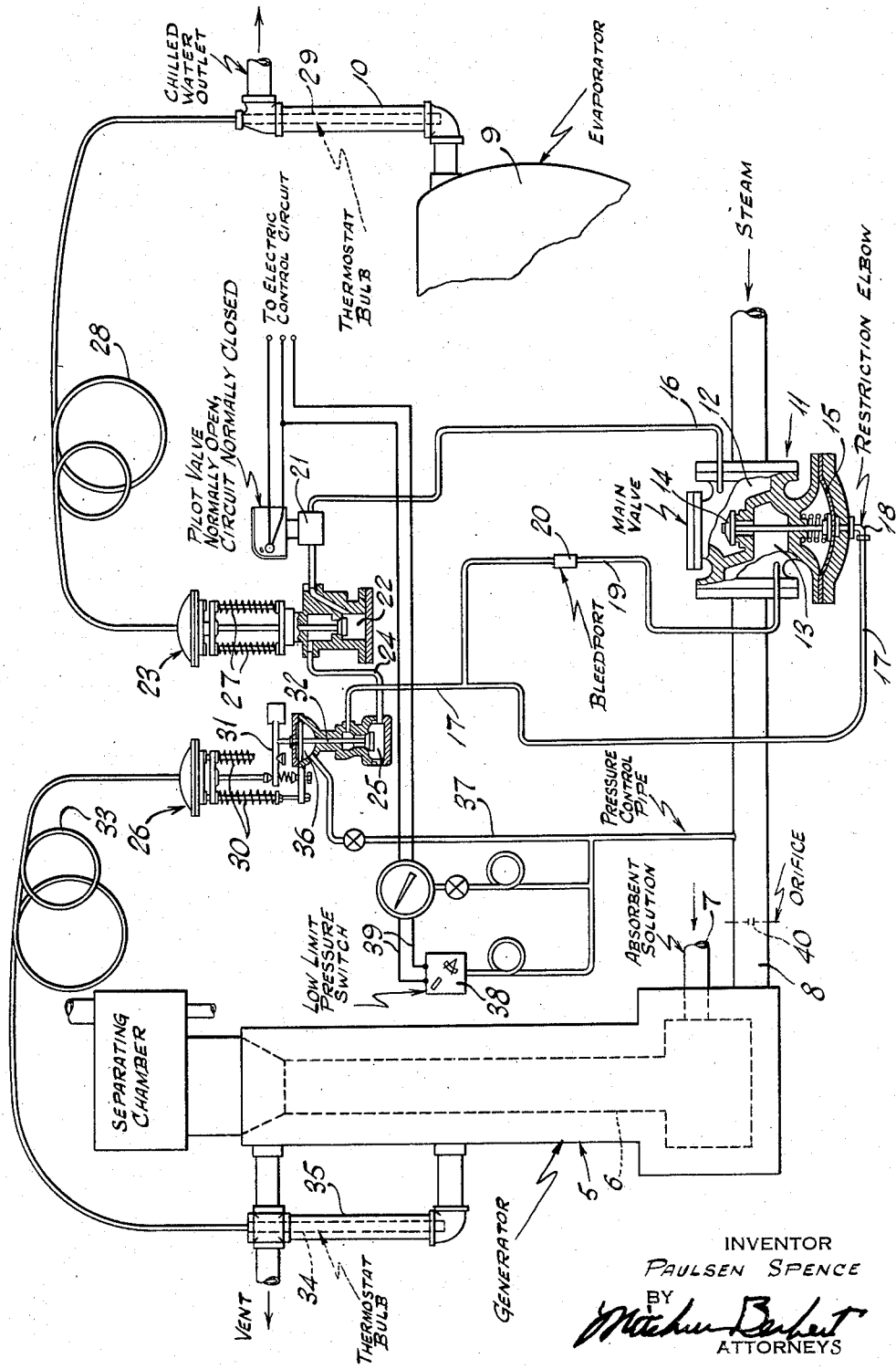
INVENTOR
PAULSEN SPENCE
BY
ATTORNEYS

United States Patent Office 2,952,136
Patented Sept. 13, 1960

2,952,136

REFRIGERATION MACHINE

Paulsen Spence, P.O. Box 77, Baton Rouge, La.

Filed Dec. 16, 1955, Ser. No. 553,594

6 Claims. (Cl. 62—148)

My invention relates to an absorption refrigeration system, and more particularly to improved control means therefor.

It is an object of the invention to provide an improved control means for an absorption refrigeration system.

More specifically, it is an object to provide a single regulating valve for controlling the flow of heating fluid to a refrigeration system and improved pilot mechanism for control of said regulating valve in accordance with temperatures, pressures, or both at various points in the refrigeration system.

Another object is to provide, in an absorption refrigeration system, a main valve for controlling the flow of heating fluid to said system and a plurality of valve means acting conjointly on said main regulating valve for controlling the latter in accordance with temperatures in the generator and in the cold zone and in accordance with the outlet side of said main regulating valve.

Another object is to provide a refrigeration system with a single control valve for controlling the flow of heating fluid to said refrigeration system and pilot valve means for stopping the flow of heating fluid to said system upon the attainment of a predetermined pressure in a part of said system.

Other objects and various features of novelty and invention will be hereinafter pointed out or will become apparent to those skilled in the art.

Briefly stated, in a preferred form of the invention, my improved control system is applied to an absorption refrigeration system which includes the usual elements of such a refrigeration system, including of course a generator for heating the absorbent and refrigeration solution and what may be termed a final cold zone where the effect of the refrigeration system is used, for example, in cooling water or the like. The various other instrumentalities in connection with an absorption refrigeration system would, of course, be included, but the invention is not concerned ordinarily with features of the refrigeration system other than with the generator and the evaporator or cold zone of the system.

In a preferred form of the invention herein illustrated, there is a pipe for conducting heating fluid to the generator and such heating fluid may be steam or other hot fluid. A single regulating valve is interposed in the line conducting heating fluid to the generator. This regulating valve is fluid pressure actuated and is controlled by fluid pressure, preferably from the high pressure side of the valve, and this control pressure is regulated or controlled by a plurality of valves arranged in parallel or in series. More specifically, the plurality of valves may consist of a normally open solenoid valve and two temperature pilots. One of the temperature pilots may have a pressure connection from the outlet side of the main regulating valve, so that that particular pilot valve is controlled by both temperature and pressure. Of course a separate pressure pilot could be used. One of the temperature pilot valves is controlled by the temperature in the generator, while the other temperature pilot valve is controlled by the temperature in the evaporator or the cold zone of the system. The solenoid valve may be controlled by various means, preferably by pressure such as the pressure in the outlet side of the main regulating valve. All of the pilot valves function to control pressure fluid to the main regulating valve, so that the amount of heating fluid is influenced by the conditions influencing all of the pilot valves.

The drawing shows, for illustrative purposes, a diagrammatic or schematic view of fragments of an absorption refrigeration system, and my improved control means associated with such a system. Since the invention is not concerned ordinarily with all parts of the refrigeration system, only the generator and the evaporator are there indicated.

In said drawings, there is a generator 5, which may consist of a shell and an inner reservoir or chamber 6 connected to the source 7 of absorbent solution, as will be understood. Steam or other heating fluid enters the outer shell of the generator through a pipe indicated at 8. The absorbent solution chamber discharges into a separating chamber, and finally in the evaporator 9 heat is extracted and this may be referred to as the cold zone which may also include an outlet connection 10, as will be clear.

The system is controlled by the amount of steam entering the generator, and in the form shown the steam passing through the pipe 8 to the generator is controlled by a main valve 11, which is fluid pressure actuated and is preferably of the well-known Spence type. This valve has an inlet side 12 and an outlet side 13, and the valve head 14 is moved by the valve rod and a diaphragm 15 in the diaphragm chamber shown. A spring tends to maintain the valve head 14 in closed position and pressure beneath the diaphragm 15 opens that valve. The main regulating valve is controlled by pressure preferably from the inlet side of the valve, the control fluid passing through a pipe 16 and then passing through valves to be described, and finally reaching the underside of the diaphragm 15 for urging the same and valve head 14 upwardly. The pipe just below the diaphragm chamber is provided with a restriction elbow 18 having a restriction or bleed therein for throttling the amount of fluid that can pass therethrough. The control line 17 has also a branch 19 which may be considered a vent pipe, which in the form shown discharges into the outlet side 13 of the main regulating valve. This branch 19 has a restriction or bleed 20 therein to limit the rate at which control fluid may be bled to the low pressure side of the valve. This particular valve 11, with its control pipes and restrictions or bleeds, is well known in the art and needs no further explanation.

In the form illustrated, the control pressure pipe 16 leads through a solenoid control valve 21, which is controlled by a solenoid which is normally in circuit to hold the valve 21 normally in open position for the free flow of control fluid therethrough. The control pressure fluid, after flowing through the solenoid valve 21, flows into the bottom 22 of a temperature pilot valve 23, and after passing the valve head flows through the pipe 24 to the chamber 25 of the temperature pilot 26, and after passing the valve head thereof passes into the control pipe 17 heretofore described. The temperature pilot 23 has a diaphragm chamber at the top and springs 27 opposing the action of the fluid pressure above the diaphragm. These springs are, of course, adjustable to vary the temperature at which the valve 23 opens. The diaphragm chamber of valve 23 is connected through tubing 28 to a thermostatic bulb 29 in the evaporator or cold zone connection 10 heretofore described. The setting of the springs 27 normally would be such that, with normal temperature about the thermostat bulb 29, the thermostatic valve 23 will be just open so as to permit the passage of control fluid. If the temperature rises at the thermostatic bulb 29, the valve 23 will be opened wider.

While the thermostatic pilot 26 has a diaphragm at the top, the same as the other pilot, and springs 30 opposing the pressure on the diaphragm, the valve stem, in the form shown, extends down and engages a lever 31 having a weight thereon, and the lever is connected to the main valve stem 32 of the valve 26 as shown. The diaphragm chamber of the thermostatic pilot 26 is connected through tubing 33 with the thermostat bulb 34 in the vent or outlet connection 35 of the generator. The springs 30 are normally set to maintain the valve connected to the steam open when there is little or no excess steam escaping from the vent 35. However, should the absorber chamber be unable to condense the steam being furnished to the generator, then the pressure in the thermoostatic bulb 34 will rise and act on the diaphragm of the pilot valve 26 to overcome the stress of the springs 30 and the weight on the lever and close the valve. The valve 26 is a combined thermostatic and pressure pilot and has a pressure chamber 36 closed by a diaphragm. A pressure connection 37 leads from this chamber to the outlet side of the main regulating valve 11, as illustrated. If the pressure rises in the outlet side of the main regulating valve, and in the pressure pipe 37, the valve stem 32 will be raised and the pilot valve closed or moved toward closed position, the same as when the steam is not condensed in the generator and the pressure rises in the thermostatic bulb 34 so as to tend to close the valve connected to the stem 32.

In addition to the controls thus far described, I provide a pressure control, which may be a high or a low limit pressure control in the outlet side of the main regulating valve 11. In the form illustrated, pipe 37 has a pipe connection to a limit pressure switch 38 connected by wires 39 to one line of the solenoid, as will be clear. This switch 38 is in series with one line leading to the solenoid so that when the switch 38 opens the circuit to the solenoid will be broken and the solenoid valve closed, thus cutting off all pressure fluid through the control pipe 16. The switch shown is a low limit switch so that the action noted above normally would only occur when there would be no load on the refrigeration system and pressure in the outlet side of the valve therefore would drop to a very low limit. Thereafter the automatic regulation of the valve 11 would advantageously cease and the solenoid valve 21 would be controlled by any electrical regulating system or by hand so as to periodically turn on the small amount of steam to make sure that the absorbent solution does not solidify.

The over-all action of the system, specifically described, is as follows: High pressure steam or other control fluid passes through the control pipe 16 and up to the solenoid valve 21. This valve, as stated, is normally held open by the solenoid, which is normally in circuit. The temperature pilot 23 will then normally be open, because the temperature in the evaporator or cold zone will be higher than normal. The temperature pilot 26 will also be open, because there will be no pressure in the pressure control pipe 37 which would tend to close the valve, and the temperature in the steam vent 35 would be low and therefore there would be no tendency to close the pressure and temperature pilot valve 26. High pressure control fluid then would be free to pass through all of the three valves 21, 23, 26, in series, and into the control pipe 17 which leads through a restriction to the diaphragm chamber beneath the diaphragm. Pressure beneath the diaphragm will raise the main regulating valve 14 from its seat and permit the passage of heating fluid through that valve and into the outlet pipe having a fixed orifice 40 and to the generator. If more steam or heating fluid is supplied to the generator than can be condensed therein, hot fluid will escape through the vent and thus the thermostat bulb 34 will be heated up so as to tend to close the valve 26 to thus throttle the main valve and reduce the quantity of steam passing to the generator. Also, if the pressure at the outlet side of the main regulating valve 11 should rise beyond a predetermined limit, pressure in the control pipe 37 would reach the diaphragm chamber 36 and also tend to close the temperature and pressure pilot 26. It will be understood that normally the pilot valve 26 will not be completely closed, but will simply modulate the flow of control fluid to the main valve diaphragm so as to maintain it open to just the desired extent. As long as the temperature in the evaporator or cold zone remains above normal, the temperature valve 23 will remain open; but when the temperature in the evaporator or cold zone drops to about the normal limit, the temperature pilot 23 will tend to close so as to throttle the control fluid to the main valve diaphragm and thus further throttle the supply of heating fluid to the generator. It will be understood that the valves 23—26 and the main valve 11 will normally not be wide open or closed tight, but that all will reach a stage of normal balance so that just the proper quantity of heating fluid will pass through the main valve 11 to the generator and the refrigerating system will work normally.

If the temperature in the evaporator or the cold zone rises, due to an overload on the system, the thermostat pilot valve 23 will open wider so as to permit more fluid to pass to the diaphragm chamber of the main regulating valve to admit more steam or heating fluid to the generator. When there is practically no load on the refrigerating system, the pilot valves may tend to close the main regulating valve to such an extent that the pressure in the outlet pipe 8 will drop to a predetermined low limit, at which time the low limit pressure switch 38 will break the circuit to the solenoid of valve 21 and will permit the latter to close, and thus cut off control fluid to the main valve 11 and permit the latter to close tight. The refrigerating system will then be under the electric control, which may be hand-operated or operated through any other mechanical or electrical means, so as to open the valve 21 from time to time to permit some steam to enter the generator and keep the absorbent solution from solidifying.

My improved system has many advantages over the systems of control heretofore used. For example, the solenoid valve 21 provides for a complete shut-down of the refrigeration system, due for example to a cessation of load on the refrigeration system or through the operation of any other safety devices which may be connected to the solenoid valve. This function of shutting off the refrigeration system has heretofore been normally controlled by a separate and additional electrically motorized valve in the supply pipe 8. The present improved system avoids the use of that extra valve. The temperature pilot 23 provides a modulating control of the refrigerating system output by throttling the input of heating fluid to the generator on the basis of the evaporator temperature. Such control normally has heretofore been on an on-and-off basis and not on a modulating basis as is provided by the valve 23. The pressure control part of the pilot valve 26 serves as a high limit control on the heating fluid input, and therefore of the chilling rate, by holding a maximum predetermined pressure ahead of the orifice 40 in the heating fluid line at the output side of the main valve 11.

When the condensing water supply is inadequate for the full rated operation of the refrigerating system, the present unit is such that the generator can not condense the operating steam, and this steam will then vent. The venting of steam from the generator will act on the temperature portion of the pilot valve 26 so as to throttle that pilot valve and thereby throttle the main valve 11 to keep the refrigerating system operating at the best possible rate with the available condensing water supply. Prior practice was simply to apply a safety vent switch on the generator to shut down the entire unit upon the escape of heating fluid from the generator.

The establishing of a high limit as imposed by the pressure control portion of the pilot 26 was formerly accomplished by a separate pressure reducing valve in the main steam line and located ahead of the aforementioned additional electrically motorized shut-off valve. When, under the prior art systems, a condensing water supply was inadequate, the normal procedure was to reduce the maximum heating fluid input by way of the aforementioned reducing valve to an input which could be sustained even under the worst condensing water conditions. This manner of operation resulted in the undesirable condition of a unit good for 25 tons operating always at a lesser capacity, say 20 tons.

It will thus be seen that I have provided an improved control system for an absorption type of refrigeration system which provides many advantages over the prior art control systems.

While the invention has been described in considerable detail and a preferred form illustrated, it is to be understood that various changes, additions, and omissions may be made within the scope of the invention as defined in the appended claims.

I claim:

1. In an absorption refrigeration system, a generator, a cold zone, a conduit for conveying heating fluid to said generator, a main valve in said conduit for controlling the flow of heating fluid to said generator, a fluid pressure actuated means for actuating said main valve, a pipe for conducting pressure fluid to said fluid pressure actuated means for actuating said main valve, a pair of temperature pilot valves in series in said pipe for controlling the flow of pressure fluid therethough, each of said pilot valves having pilot valve control means, a thermostatic connection from said generator to the pilot valve control means of one of said pair of pilot valves for controlling the same, a thermostatic connection from the cold zone to the pilot valve control means of the other of said pair of pilot valves for controlling the same, whereby a predetermined temperature in the generator or in the cold zone will cause one of said temperature pilot valves to act to cut off the flow of pressure fluid through said pipe to said pressure actuated means of said main valve, and a pressure connection from the outlet side of said main valve to the pilot valve control means of one of said temperature pilot valves to assist in controlling the same in accordance with the pressure at the outlet side of said main valve.

2. In an absorption refrigeration system, a generator, a cold zone, a conduit for conveying heating fluid to said generator, a main valve in said conduit for controlling the flow of heating fluid to said generator, a fluid pressure actuated means for actuating said main valve, a pipe connected to the high pressure side of said main valve for conducting pressure fluid to said fluid pressure actuated means for actuating said main valve, a pair of temperature pilot valves in series in said pipe for controlling the flow of pressure fluid therethrough each of said pilot valves having pilot valve control means, a thermostatic connection from said generator to the pilot valve control means of one of said pair of pilot valves for controlling the same, a thermostatic connection from the cold zone to the pilot valve control means of the other of said pair of pilot valves for controlling the same, whereby a predetermined temperature in the generator or in the cold zone will cause one of said temperature pilot valves to act to cut off the flow of pressure fluid through said pipe to said pressure actuated means of said main valve.

3. In an absorption refrigeration system, a generator, a cold zone, a conduit for conveying heating fluid to said generator, a main valve in said conduit for controlling the flow of heating fluid to said generator, a fluid pressure actuated means for actuating said main valve, a pipe connected to the hgh pressure side of said main valve for conducting pressure fluid to said fluid pressure actuated means for actuating said main valve whereby the pressure fluid from the high pressure side of said main valve will constitute the actuating pressure for said fluid pressure actuated means, a normally open solenoid valve in said pipe whereby said solenoid valve will control the flow of pressure fluid to said fluid pressure actuated means, a pair of temperature pilot valves in series in said pipe for controlling the flow of pressure fluid therethrough, each of said pilot valves having pilot valve control means, a thermostatic connection from said generator to the pilot valve control means of one of said pair of pilot valves for controlling the same, a thermostatic connection from the cold zone to the pilot valve control means of the other of said pair of pilot valves for controlling the same, whereby a predetermined temperature in the generator or in the cold zone will cause one of said temperature pilot valves to act to cut off the flow of pressure fluid through said pipe to said pressure actuated means of said main valve.

4. In the combination defined in claim 3, a pressure switch in series with the solenoid of said solenoid valve, a fluid pressure connection from the outlet side of said main regulating valve for controlling the position of said switch in accordance with the outlet pressure of said main regulating valve, whereby actuation of said pressure switch will affect the position of said solenoid valve.

5. In an absorption refrigeration system, a generator, a cold zone, a pipe for conducting heating fluid to said generator, a main regulating valve for controlling the flow of fluid to said generator through said pipe, fluid pressure actuated means for controlling said main valve, an electric shut-off valve and two temperature pilot valves all in series, a pressure connection from the last of said valves in series to the fluid pressure actuated means of said main regulating valve, a pressure connection from the low pressure side of said regulating valve to one of said temperature pilot valves for assisting in controlling the latter, thermostatic connections from the generator and from the cold zone to said temperature pilots respectively for assisting in controlling the same, a pressure connection from said heating fluid pipe to said electric shut-off valve whereby, upon the attainment of a definite pressure in said heating fluid pipe, said electric shut-off valve will be actuated so as to cut off the supply of pressure fluid to said fluid pressure actuated means of said main regulating valve and said main regulating valve will close.

6. In an absorption refrigeration system, a generator, a pipe for conducting heating fluid to said generator, a main regulating valve for controlling the flow of fluid through said pipe to said generator, fluid pressure actuated means for actuating said main valve, a combined temperature and pressure pilot for controlling the flow of fluid to said pressure actuated means of said main regulating valve, a solenoid operated valve in normally open position in series with said temperature and pressure pilot valve for conducting the pressure fluid to said pressure and temperature pilot valve for controlling the flow of fluid to the pressure actuated means of said main regulating valve, and a pressure switch connected to and operated by the pressure at the outlet side of said main regulating valve and operable upon the attainment of a minimum pressure therein, said switch being in series with said solenoid whereby, upon actuation of said switch, said solenoid valve will be closed and the supply of control fluid to said fluid pressure actuated means of said main regulating valve will be stopped and said main regulating valve will be closed.

References Cited in the file of this patent

UNITED STATES PATENTS

| | | |
|---|---|---|
| 2,171,745 | Grubb | Sept. 5, 1939 |
| 2,293,556 | Newton | Aug. 18, 1942 |
| 2,502,104 | Reid | Mar. 28, 1950 |
| 2,566,480 | Berestneff | Sept. 4, 1951 |
| 2,582,837 | Leonard | Jan. 15, 1952 |
| 2,733,575 | Leonard | Feb. 7, 1956 |